United States Patent
Kim et al.

(10) Patent No.: US 11,110,391 B2
(45) Date of Patent: Sep. 7, 2021

(54) SYSTEM FOR SIMULTANEOUSLY REMOVING NITROGEN OXIDES (NOX) AND SULFUR OXIDES (SOX) FROM EXHAUST GAS

(71) Applicant: DOOSAN HEAVY INDUSTRIES & CONSTRUCTION CO., LTD., Changwon-si (KR)

(72) Inventors: Joon Ho Kim, Yongin-si (KR); Ho Yong Jo, Yongin-si (KR); Ja Hyung Koo, Suwon-si (KR); In Gab Chang, Yongin-si (KR)

(73) Assignee: DOOSAN HEAVY INDUSTRIES & CONSTRUCTION CO., LTD., Gyeongsangnam-do (KR)

( * ) Notice: Subject to any disclaimer, the term of this patent is extended or adjusted under 35 U.S.C. 154(b) by 259 days.

(21) Appl. No.: 16/245,208

(22) Filed: Jan. 10, 2019

(65) Prior Publication Data
US 2019/0224616 A1 Jul. 25, 2019

(30) Foreign Application Priority Data

Jan. 25, 2018 (KR) .......... 10-2018-0009421
Mar. 7, 2018 (KR) .......... 10-2018-0026868

(51) Int. Cl.
*B01D 53/14* (2006.01)
*B01D 53/18* (2006.01)
(Continued)

(52) U.S. Cl.
CPC ....... *B01D 53/185* (2013.01); *B01D 53/1481* (2013.01); *B01D 53/1493* (2013.01);
(Continued)

(58) Field of Classification Search
CPC .............. B01D 53/1456; B01D 53/1481; B01D 53/50; B01D 53/502; B01D 53/56;
(Continued)

(56) References Cited

U.S. PATENT DOCUMENTS

| | | | | |
|---|---|---|---|---|
| 10,549,234 | B2 * | 2/2020 | Chang | B01D 53/346 |
| 10,561,981 | B2 * | 2/2020 | Chang | B01D 53/346 |
| 2005/0238549 | A1 | 10/2005 | Hammel | |

FOREIGN PATENT DOCUMENTS

| | | |
|---|---|---|
| CN | 101785962 A | 7/2010 |
| CN | 103480251 A | 1/2014 |

(Continued)

OTHER PUBLICATIONS

A Korean Office Action dated Apr. 12, 2019 in connection with Korean Patent Application No. 10-2018-0026868 which corresponds to the above-referenced U.S. application.
(Continued)

*Primary Examiner* — Timothy C Vanoy
(74) *Attorney, Agent, or Firm* — Invenstone Patent, LLC

(57) ABSTRACT

A system for oxidizing nitrogen monoxide (NO) contained in exhaust gas injects a liquid oxidizing agent into the exhaust gas and simultaneously removes nitrogen oxides and sulfur oxides from exhaust gas using an organic catalyst. The system includes an absorption tank for storing an absorption solution containing an organic catalyst, the absorption tank communicating with an oxygen supply pipe for supplying oxygen-containing gas to the absorption tank; an absorption tower, extending upward from the absorption tank, through which the exhaust gas flows from an exhaust gas inlet duct to an exhaust gas outlet; a first injection unit to inject the absorption solution into the absorption tower; a second injection unit to inject an oxidizing agent solution into at least one of the inlet duct and the absorption tower;

(Continued)

and an oxidizing agent supply unit for supplying the oxidizing agent solution to the second injection unit.

20 Claims, 10 Drawing Sheets

(51) Int. Cl.
    *B01D 53/56*     (2006.01)
    *B01D 53/60*     (2006.01)
    *B01D 53/78*     (2006.01)
    *B01D 53/79*     (2006.01)
    *B01D 53/86*     (2006.01)

(52) U.S. Cl.
    CPC ............ *B01D 53/56* (2013.01); *B01D 53/60* (2013.01); *B01D 53/78* (2013.01); *B01D 53/79* (2013.01); *B01D 53/8628* (2013.01); *B01D 53/8637* (2013.01); *B01D 53/8693* (2013.01); *B01D 2252/205* (2013.01); *B01D 2252/2056* (2013.01); *B01D 2257/302* (2013.01); *B01D 2257/404* (2013.01); *B01D 2258/0283* (2013.01); *B01D 2259/124* (2013.01)

(58) Field of Classification Search
    CPC .... B01D 53/60; B01D 53/78; B01D 2251/10; B01D 2251/70; B01D 2257/302; B01D 2257/402; B01D 2257/404; B01D 2258/0283; B01J 10/00; B01J 19/24; B01J 31/0215; B01J 2219/00
    See application file for complete search history.

(56) References Cited

FOREIGN PATENT DOCUMENTS

| | | |
|---|---|---|
| JP | 2015-211938 A | 11/2015 |
| KR | 20-1998-0030926 U | 8/1998 |
| KR | 10-0262903 B1 | 8/2000 |
| KR | 10-2003-0006429 A | 1/2003 |
| KR | 10-0583930 B1 | 5/2006 |
| KR | 10-0910038 B1 | 7/2009 |
| KR | 10-1615142 B1 | 5/2016 |
| KR | 10-1769033 B1 | 8/2017 |
| KR | 10-1774170 B1 | 9/2017 |
| KR | 10-1784938 B1 | 10/2017 |
| WO | 2017014200 A1 | 1/2017 |

OTHER PUBLICATIONS

A Korean Office Action dated Feb. 28, 2019 in connection with Korean Patent Application No. 10-2018-0009421 which corresponds to the above-referenced U.S. application.

* cited by examiner

[FIG. 1]
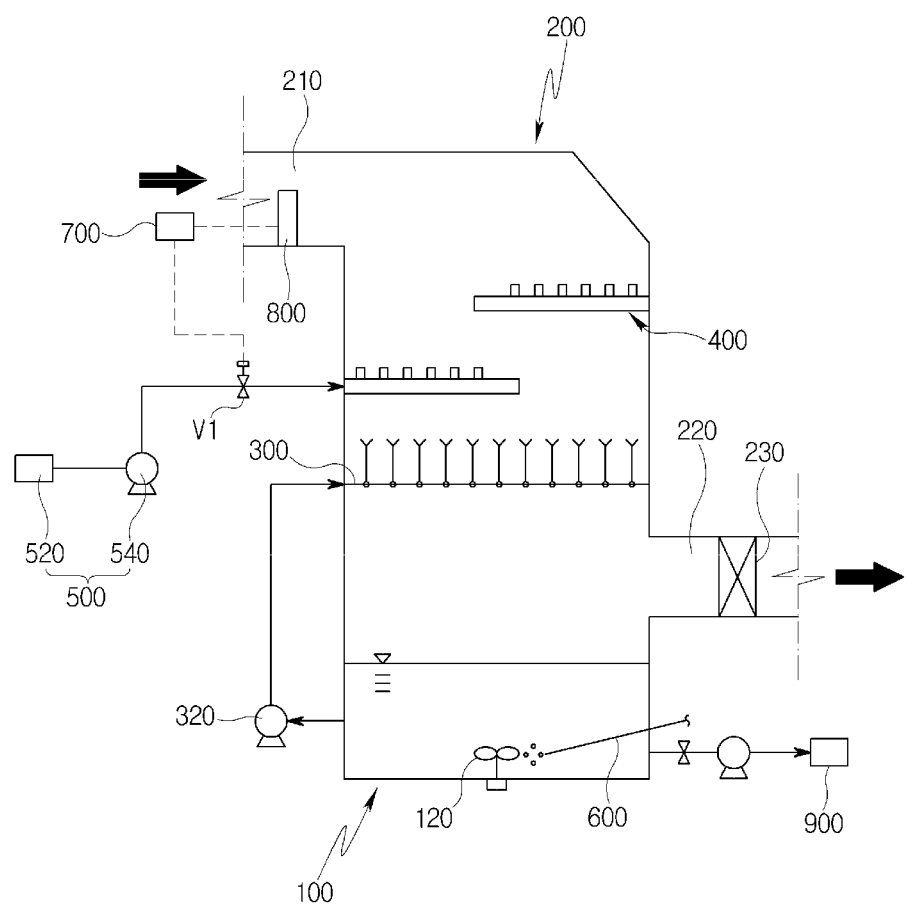

[FIG. 2]
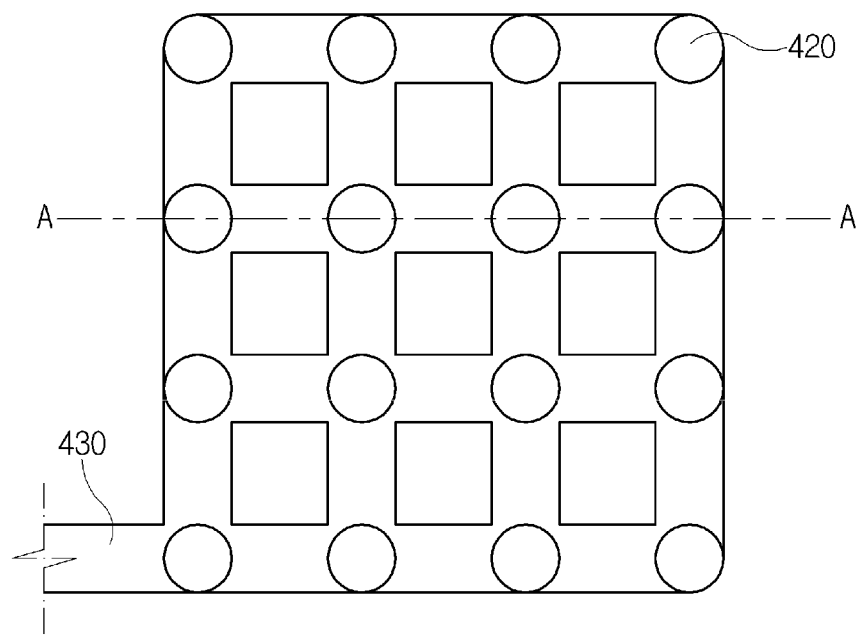

[FIG. 3]
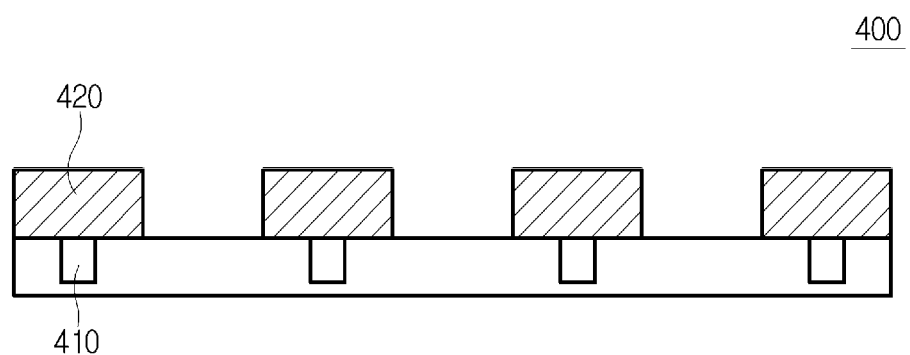

[FIG. 4]
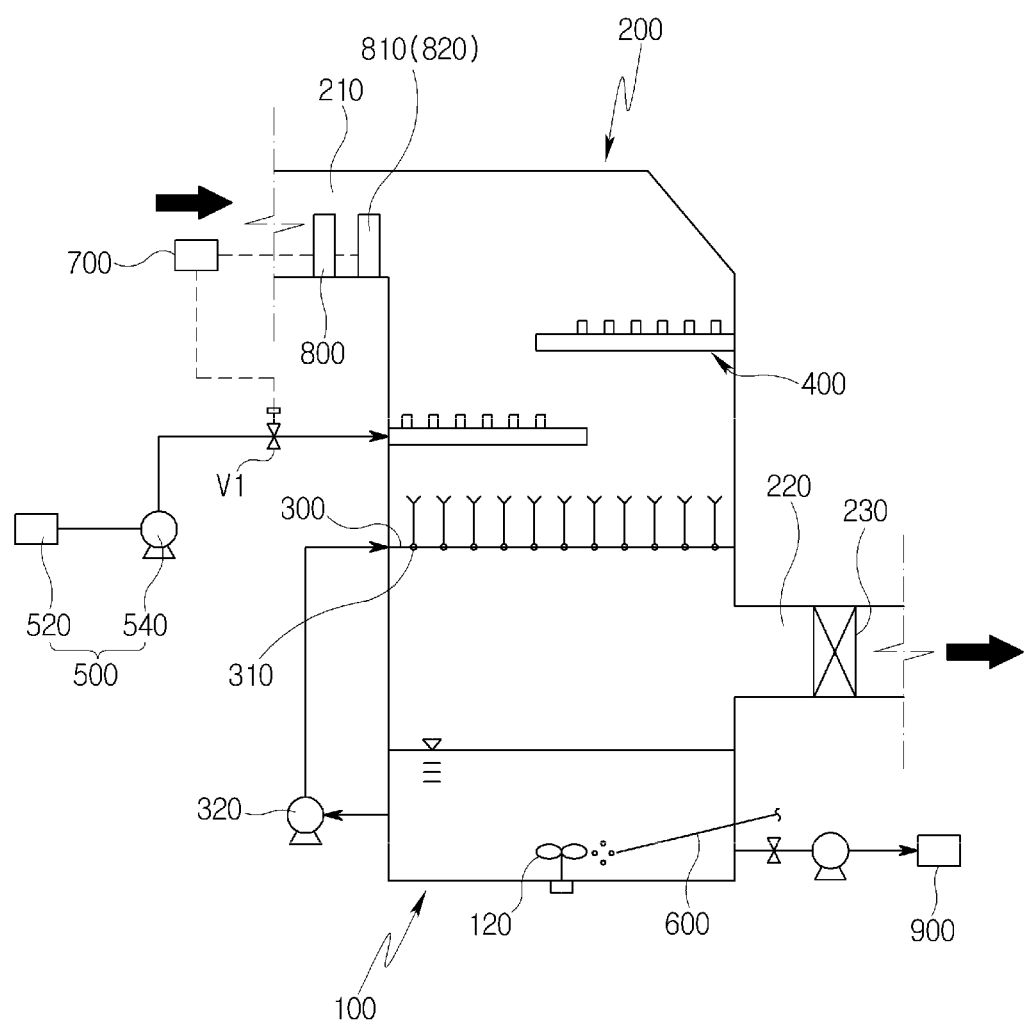

[FIG. 5]
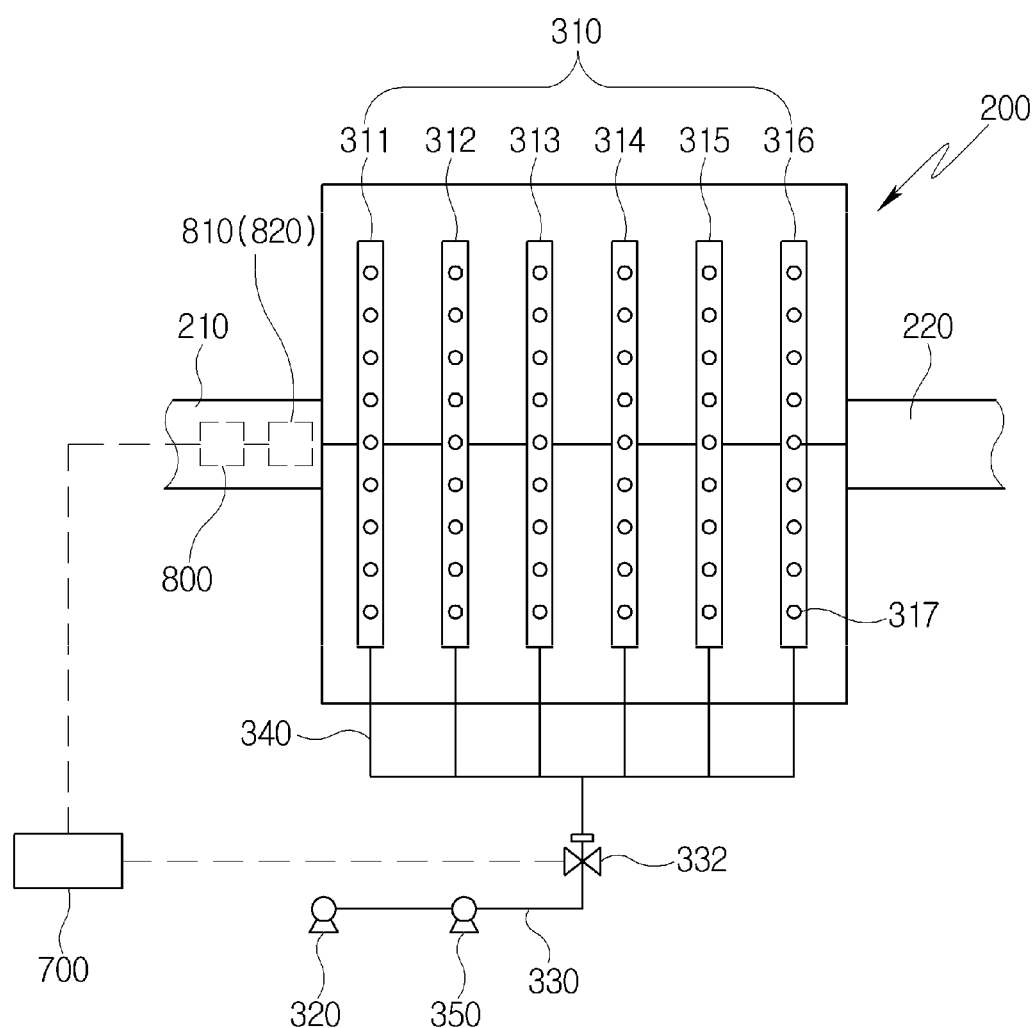

[FIG. 6]
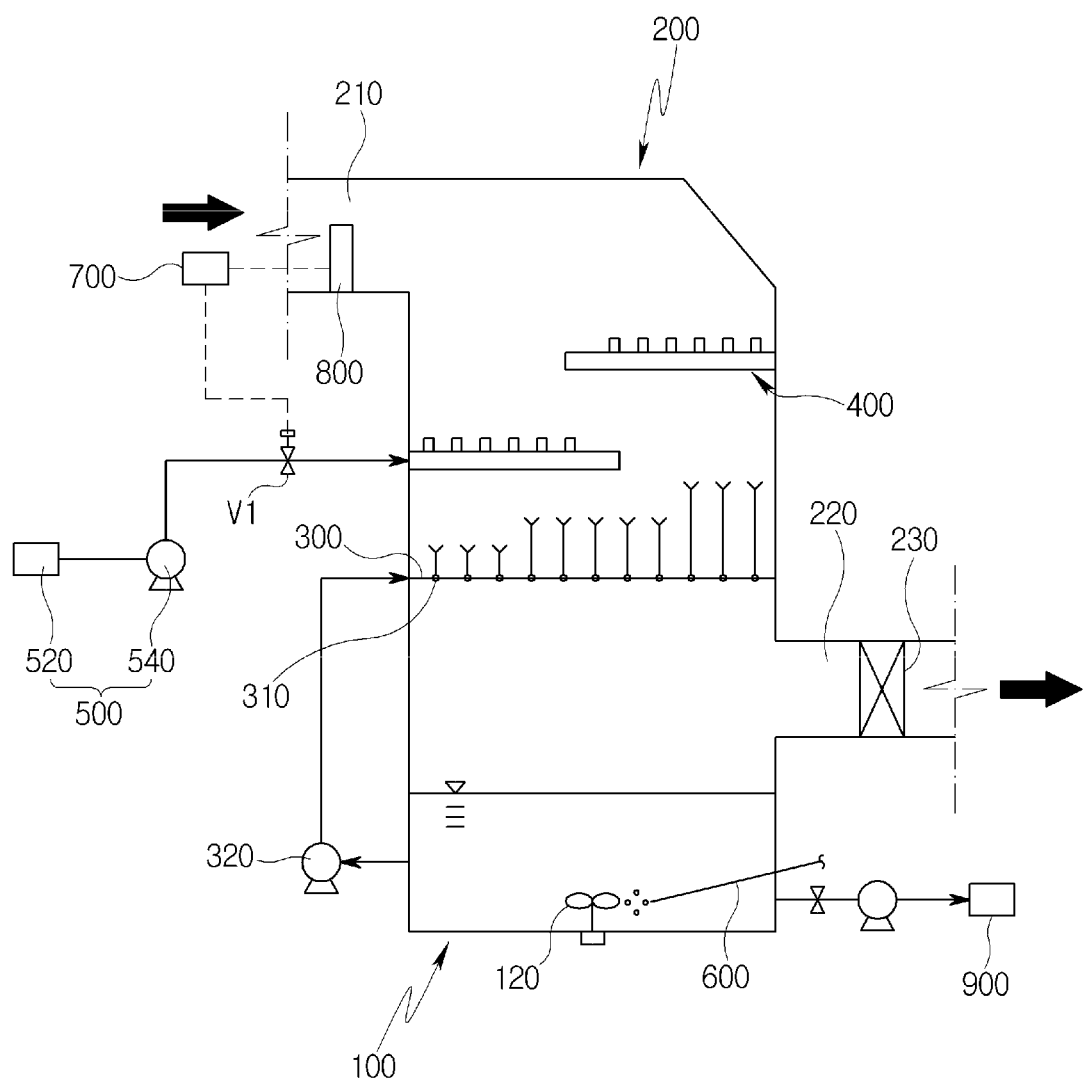

[FIG. 7]
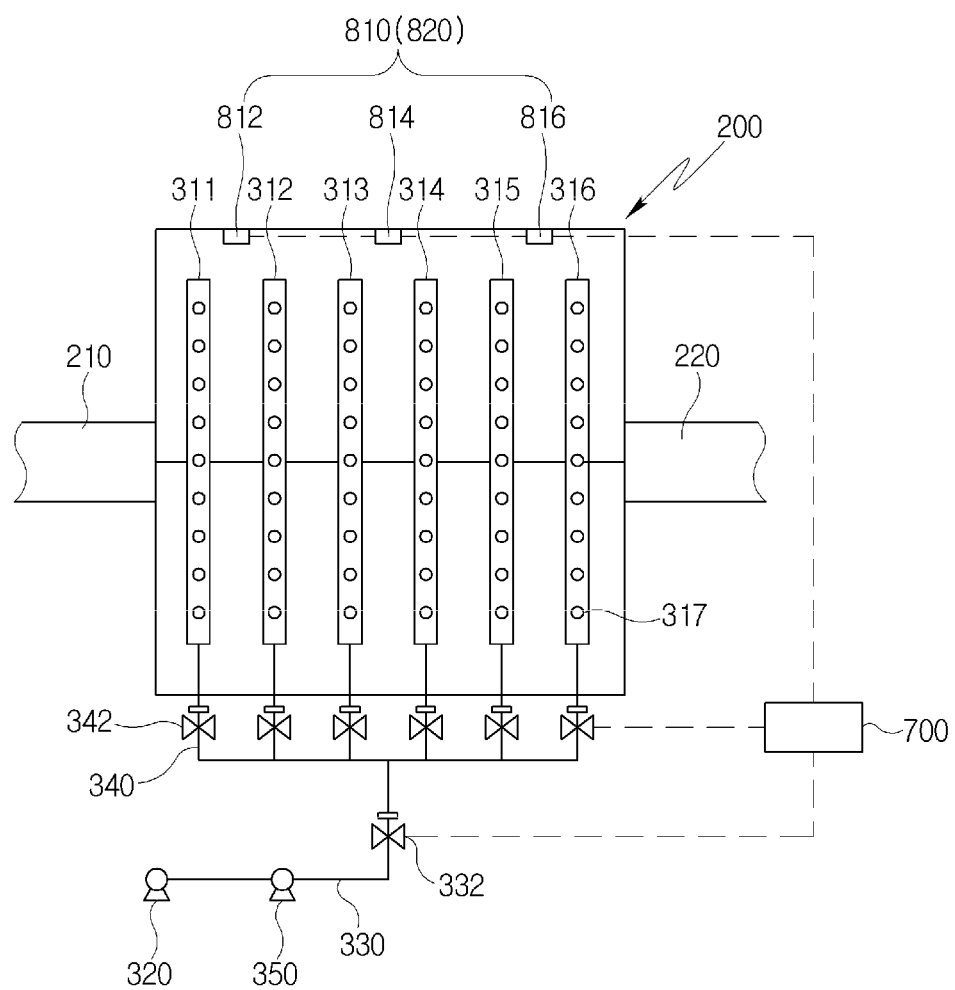

[FIG. 8]
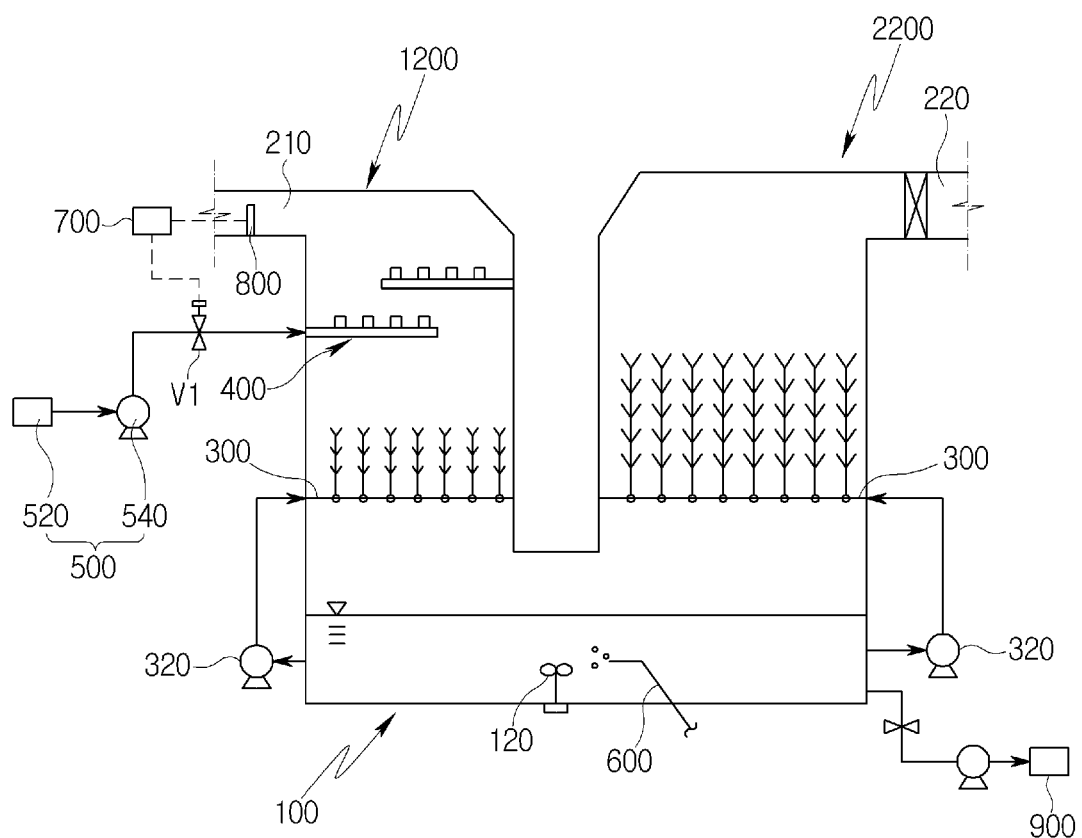

[FIG. 9]
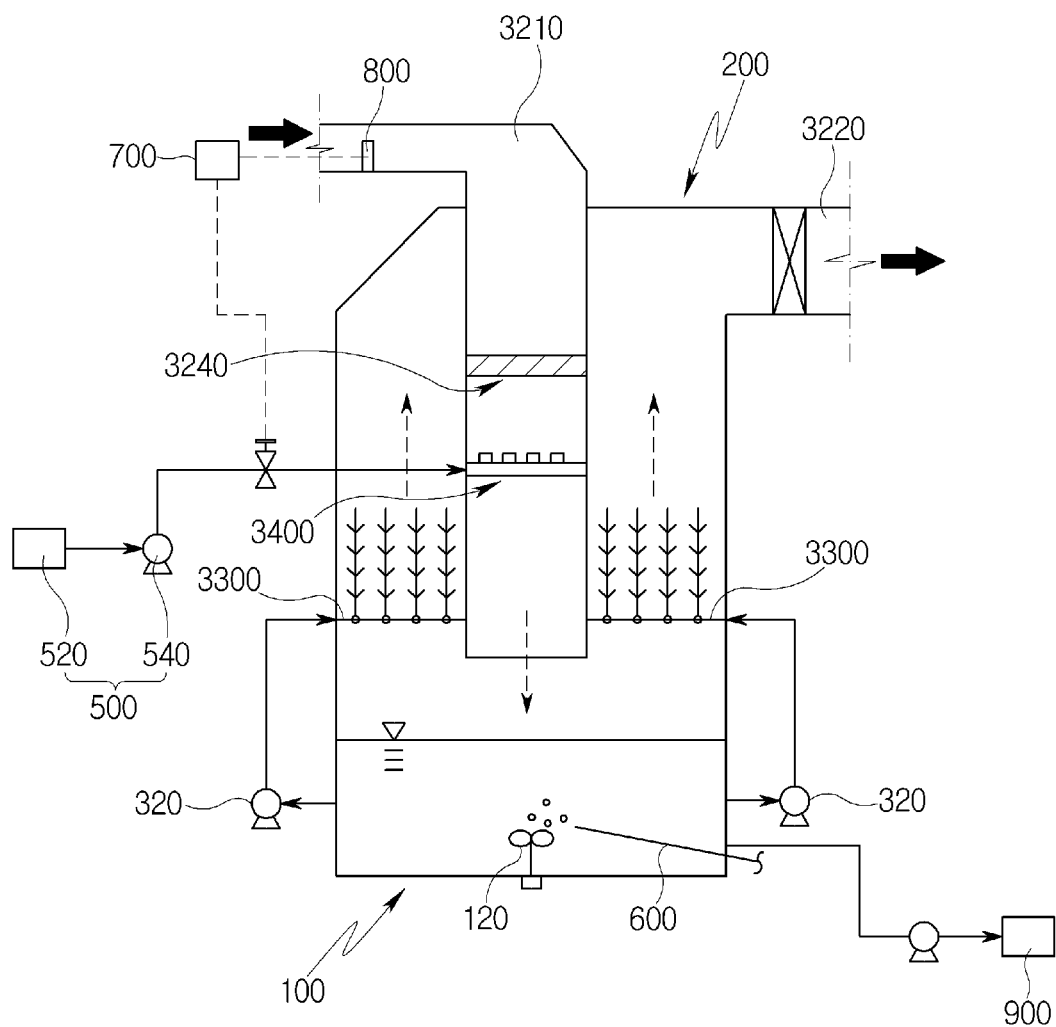

[FIG. 10]
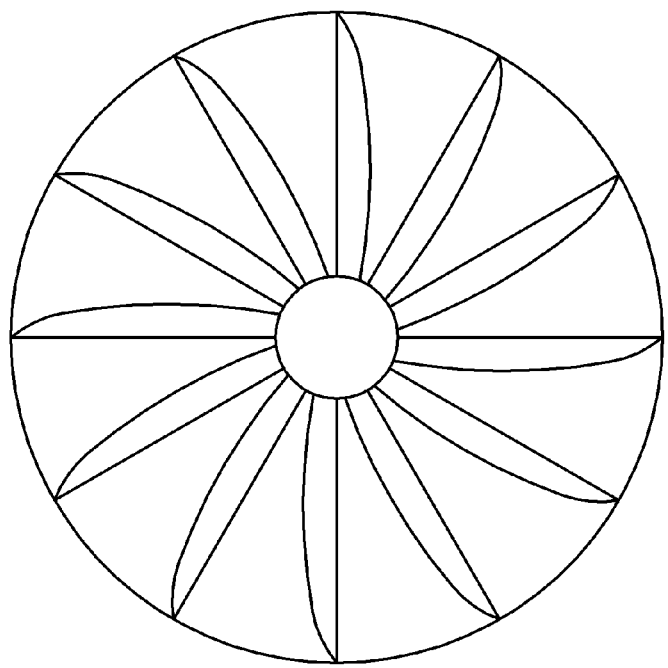

SYSTEM FOR SIMULTANEOUSLY REMOVING NITROGEN OXIDES (NOX) AND SULFUR OXIDES (SOX) FROM EXHAUST GAS

CROSS-REFERENCE TO RELATED APPLICATIONS

This application claims priority to Korean Patent Application Nos. 10-2018-0026868 and 10-2018-0009421, filed on Mar. 7, 2018, and Jan. 25, 2018, respectively, the disclosures of which are incorporated herein by reference in their entirety.

BACKGROUND OF THE INVENTION

Field of the Invention

Exemplary embodiments of the present disclosure relate to a system for simultaneously removing nitrogen oxides and sulfur oxides from exhaust gas, and more particularly, to a system for oxidizing nitrogen monoxide (NO) contained in exhaust gas by injecting a liquid oxidizing agent into the exhaust gas and for simultaneously removing nitrogen oxides and sulfur oxides from the exhaust gas using an organic catalyst.

Description of the Related Art

Fossil fuel such as coal and air containing excess oxygen are injected into and burned in a boiler. As a result of the combustion, by-products, such as fly ash, carbon dioxide ($CO_2$), nitrogen oxides (NOx), sulfur oxides (SOx), carbon monoxide (CO), and unburned carbon powder (HC) are produced together with heat, and unreacted nitrogen ($N_2$) and oxygen ($O_2$) remain in the boiler.

When fuel containing sulfur is burned as described above, sulfur is released into the atmosphere in the form of sulfur dioxide ($SO_2$), except that it is adhered to ash. This sulfur dioxide causes air pollution and acid rain, which have a detrimental effect on the environment as well as humans and animals.

In addition, nitrogen oxides are mainly produced by the reaction between oxygen and nitrogen, which are basically present in the atmosphere, at a high temperature where various processes (combustion) are performed, and are mainly released in the form of nitrogen monoxide (NO). These nitrogen oxides not only bring acid rain but also form ozone and photochemical smog.

Accordingly, in order to protect the environment, large incineration and power plants and the like have been commonly equipped with denitrification and desulfurization systems for treating nitrogen oxides and sulfur oxides in exhaust gas.

Most denitrification systems are of a selective catalytic reduction (SCR) type. The SCR system simultaneously passes exhaust gas and an ammonia ($NH_3$) reducing agent through a catalyst layer to selectively reduce NOx in the exhaust gas into nitrogen and water vapor by the reaction of ammonia.

Meanwhile, most desulfurization systems are of a wet flue-gas desulfurization type. In wet desulfurization, exhaust gas comes into gas-liquid contact with an absorption fluid containing alkali such as lime, so that sulfur oxide is absorbed and removed from the exhaust gas. In this case, although various methods are classified according to the gas-liquid contact between the exhaust gas and the absorption fluid, a spray method is widely used.

As a result, the sulfur oxide absorbed from the exhaust gas forms sulfite in the absorption fluid, and the sulfite is typically oxidized by blowing air into the absorption fluid to produce gypsum as by-products.

As described above, since the conventional wet flue-gas desulfurization system does not have the ability to remove nitrogen oxides from exhaust gas, it includes a separate denitrification system. The conventional method of removing nitrogen oxides from exhaust gas mainly uses a catalyst for forming nitrogen and water or ammonia. However, this method is effective only in the narrow temperature range of exhaust gas, is relatively costly, and is prone to dust generation.

SUMMARY OF THE INVENTION

The present disclosure has been made in view of the above-mentioned problems, and an object thereof is to provide a system for oxidizing nitrogen monoxide (NO) contained in exhaust gas by injecting a liquid oxidizing agent into the exhaust gas and for simultaneously removing nitrogen oxides and sulfur oxides from the exhaust gas using an organic catalyst.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

To accomplish the above object, an aspect of the present disclosure provides a system for simultaneously removing nitrogen oxides and sulfur oxides from exhaust gas. The system includes an absorption tank for storing an absorption solution containing an organic catalyst, the absorption tank communicating with an oxygen supply pipe for supplying oxygen-containing gas to the absorption tank; an absorption tower, extending upward from the absorption tank, through which the exhaust gas flows from an exhaust gas inlet duct to an exhaust gas outlet; a first injection unit to inject the absorption solution into the absorption tower; a second injection unit to inject an oxidizing agent solution into at least one of the inlet duct and the absorption tower; and an oxidizing agent supply unit for supplying the oxidizing agent solution to the second injection unit.

The organic catalyst may include an oil-derived organic sulfoxide.

The oxidizing agent in the oxidizing agent solution may include at least one of $H_2O_2$, $NaClO_2$, $KMnO_4$, and $P_4O_{10}$.

The exhaust gas introduced into the inlet duct may primarily come into contact with the oxidizing agent solution injected by the second injection unit, and may secondarily come into contact with the absorption solution injected by the first injection unit.

The oxidizing agent supply unit may include a storage tank for storing the oxidizing agent solution; and a feed pump for supplying the stored oxidizing agent solution to the second injection unit.

The second injection unit may include a tray having a plurality of nozzles from which the oxidizing agent solution is injected. Each of the nozzles may be equipped with an ultrasonic mist generator. The tray may consist of a plurality of trays alternately and respectively installed on opposite sides of the absorption tower.

The system may further include a concentration meter for measuring a concentration of nitrogen monoxide (NO) in the exhaust gas introduced into the inlet duct. The system may further include a control unit to control an injection amount of the oxidizing agent solution injected by the second injection unit according to the concentration of nitrogen monoxide (NO) in exhaust gas measured by the concentration meter. The control unit may be configured to increase the injection amount of the oxidizing agent solution injected by the second injection unit when the concentration of nitrogen monoxide (NO) in exhaust gas measured by the concentration meter exceeds a reference value. Meanwhile, the control unit may be configured to decrease the injection amount of the oxidizing agent solution injected by the second injection unit when the concentration of nitrogen monoxide (NO) in exhaust gas measured by the concentration meter does not exceed the reference value.

The system may further include a turbulence generator installed in at least one of the inlet duct and the absorption tower.

The system may further include a neutralization tank to neutralize nitric acid and sulfuric acid released from the absorption tank. The neutralizing agent for neutralization may include one of ammonia-water, urea-water, and calcium carbonate aqueous solution.

A flow rate of the absorption solution injected by the first injection unit may be regulated.

The first injection unit may include a plurality of header pipes installed in the absorption tower; a plurality of injection nozzles installed to each of the header pipes; a circulation pump for supplying the absorption solution in the absorption tank to the header pipes; a first connection pipe connected to the circulation pump; and a plurality of second connection pipes branched from the first connection pipe to be respectively connected to the header pipes. The first connection pipe may be provided with a first flow control valve to regulate a flow rate of the absorption solution introduced into the second connection pipes. Each of the second connection pipes may be provided with a second flow control valve to regulate a flow rate of the absorption solution introduced into the header pipe connected to that second connection pipe.

The system may further include at least one of a first flow meter installed in the inlet duct to measure a flow rate of the exhaust gas introduced through the inlet duct; and a second flow meter installed in each of a plurality of regions in the absorption tower to measure a flow rate of exhaust gas in that region. Alternatively, the system may further include at least one of a first concentration meter installed in the inlet duct to measure a concentration of sulfur dioxide in the exhaust gas introduced through the inlet duct; and a second concentration meter installed in each of a plurality of regions in the absorption tower to measure a concentration of sulfur dioxide in exhaust gas in that region.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a schematic diagram of a system for simultaneously removing nitrogen oxides and sulfur oxides from exhaust gas according to a first embodiment of the present disclosure;

FIG. 2 is a plan view of the second injection unit of FIG. 1;

FIG. 3 is a cross-sectional view taken along line A-A of FIG. 2;

FIG. 4 is a schematic diagram of a system for simultaneously removing nitrogen oxides and sulfur oxides from exhaust gas according to a second embodiment of the present disclosure;

FIG. 5 is a schematic view of the first injection unit of FIG. 4;

FIG. 6 is a schematic diagram of a system for simultaneously removing nitrogen oxides and sulfur oxides from exhaust gas according to a third embodiment of the present disclosure;

FIG. 7 is a schematic view of the first injection unit of FIG. 6;

FIG. 8 is a schematic diagram of a system for simultaneously removing nitrogen oxides and sulfur oxides from exhaust gas according to a fourth embodiment of the present disclosure;

FIG. 9 is a schematic diagram of a system for simultaneously removing nitrogen oxides and sulfur oxides from exhaust gas according to a fifth embodiment of the present disclosure; and FIG. 10 is a plan view of the turbulence generator of FIG. 9.

DESCRIPTION OF SPECIFIC EMBODIMENTS

Hereinafter, a system for simultaneously removing nitrogen oxides and sulfur oxides from exhaust gas according to exemplary embodiments of the present disclosure will be described in more detail with reference to the accompanying drawings.

In addition, the terms used in the specification are terms defined in consideration of functions of the present disclosure, and these terms may vary with the intention or practice of a user or an operator. The following embodiments are not intended to limit the spirit and scope of the disclosure but are merely for the purpose of describing the components set forth in the appended claims.

For clear explanation of the present disclosure, parts irrelevant to the description may be omitted in the drawings, and like reference numerals refer to like parts throughout the specification. In the whole specification, it will be understood that when a component is referred to as "comprising or including" any component, it does not exclude other components, but can further comprise or include the other components unless otherwise specified.

The system of the present disclosure is to remove sulfur oxides and nitrogen oxides from exhaust gas in a boiler or the like by the gas-liquid contact between an absorption solution and the exhaust gas. In the exhaust gas, most of the nitrogen oxides are in the form of nitrogen monoxide (NO) while some are in the form of nitrogen dioxide ($NO_2$). In the exhaust gas, most of the sulfur oxides are in the form of sulfur dioxide ($SO_2$) while about 1% to 2% are in the form of sulfur trioxide ($SO_3$).

First, a system for simultaneously removing nitrogen oxides and sulfur oxides from exhaust gas according to a first embodiment of the present disclosure will be described with reference to FIGS. 1 to 3.

The system according to the first embodiment of the present disclosure may largely include an absorption tank 100, an absorption tower 200, an exhaust gas inlet duct 210, an exhaust gas outlet duct 220, a first injection unit 300, a circulation pump 320, a second injection unit 400, an oxidizing agent supply unit 500, an oxygen supply pipe 600, a control unit 700, and a concentration meter 800.

Specifically, the absorption tank 100 may store an absorption solution containing an organic catalyst, and may have various cross-sectional shapes such as a circular shape or a square shape. In the present embodiment, the absorption tank will be described as being a square tank.

In this case, the organic catalyst may be an oil-derived organic sulfoxide in the present embodiment. The organic sulfoxide corresponds to an acidic extractant, and particularly to an organic sulfoxide obtained through the oxidation of organic sulfides contained in oil.

That is, the absorption solution is a water-in-organic sulfoxide solution, in which case the weight ratio of water to organic sulfoxide may be varied from 10:90 to 90:10, preferably from 10:90 to 50:50.

The absorption tower 200 may extend upward of the absorption tank 100 and may be formed integrally with the absorption tank 100.

The exhaust gas inlet duct 210 for introduction of exhaust gas is provided at one side of the absorption tower 200 and the exhaust gas outlet duct 220 for discharge of purified exhaust gas is provided at the other side of the absorption tower 200.

In the present embodiment, the inlet duct 210 is provided at the upper left of the absorption tower 200 and the outlet duct 220 is provided at the lower right of the absorption tower 200 in FIG. 1. Accordingly, the exhaust gas introduced through the inlet duct 210 flows downward in the absorption tower 200 and is discharged through the outlet duct 220.

Although the positions of the inlet duct 210 and the outlet duct 220 are not limited thereto, the inlet duct 210 and the outlet duct 220 are preferably provided such that the exhaust gas introduced through the inlet duct 210 may individually come into contact with the absorption solution injected by the first injection unit 300 and the oxidizing agent solution injected by the second injection unit 400 and then be discharged through the outlet duct 220.

The second injection unit 400 for injection of an oxidizing agent solution is installed in the absorption tower 200, and the oxidizing agent supply unit 500 serves to supply the oxidizing agent solution to the second injection unit 400.

In this case, the oxidizing agent in the oxidizing agent solution may be at least one of $H_2O_2$, $NaClO_2$, $KMnO_4$, and $P_4O_{10}$.

The oxidizing agent supply unit 500 includes a storage tank 520 for storing an oxidizing agent solution, and a feed pump 540 for supplying the oxidizing agent solution stored in the storage tank 520 to the second injection unit 400.

Furthermore, a flow control valve V1 is installed in an oxidizing agent supply line through which an oxidizing agent solution is supplied from the storage tank 520 to the second injection unit 400, to regulate the flow rate of the oxidizing agent solution supplied to the second injection unit 400. Hereinafter, the flow control of the oxidizing agent solution supplied to the second injection unit 400 will be described in detail.

In the present embodiment, the second injection unit 400 includes a tray having a plurality of nozzles 410 (FIG. 3) from which an oxidizing agent solution is injected. Specifically, the tray may be configured as a grid pattern in which one nozzle 410 is provided at each point of intersection as illustrated in FIGS. 2 and 3, but the present disclosure is not limited to this configuration. For example, the tray may be variously configured and may have a plate shape having a plurality of nozzles 410.

In this case, each of the nozzles 410 may be equipped with an ultrasonic mist generator 420 so that the oxidizing agent solution is misted, through the nozzle 410, to make gas-liquid contact with the exhaust gas passing through the second injection unit 400 over a larger area. Thus, it is possible to improve oxidation efficiency.

To this end, the tray has a solution inlet 430 for the supply of the oxidizing agent solution to the nozzles 410. That is, the inlet 430 may be provided at one side of the tray, and the oxidizing agent solution may be supplied from the storage tank 520 through the oxidizing agent supply line to the inlet 430. Although not illustrated in the drawings, the tray may also have an outlet for the discharge of the oxidizing agent solution.

In addition, the tray may consist of a plurality of trays alternately and respectively installed at one side and the other side of the absorption tower 200. In the present embodiment, the constituent tray of the second injection unit 400 consists of two trays that are respectively installed at opposite sides within the absorption tower 200, as illustrated in FIG. 1. In this case, the two trays are installed at different heights. However, the present disclosure is not limited to this configuration, and a single tray may be installed in the entire region of the cross-section of the absorption tower 200.

Accordingly, the exhaust gas introduced through the inlet duct 210 flows downward in the absorption tower 200, sequentially passes through the two trays, and comes into gas-liquid contact with the oxidizing agent solution injected by the second injection unit 400. The oxidizing agent solution oxidizes nitrogen monoxide (NO), which is present in exhaust gas, to nitrogen dioxide ($NO_2$). That is, nitrogen monoxide (NO) is mostly present in the exhaust gas before passing through the second injection unit 400, whereas nitrogen dioxide ($NO_2$) is mostly present in the exhaust gas passing through the second injection unit 400.

This is because the nitrogen monoxide (NO) contained in exhaust gas must be oxidized to nitrogen dioxide ($NO_2$) to absorb the nitrogen monoxide (NO) into the absorption solution since the nitrogen monoxide (NO) is not dissolved well in water and does not form a compound with water or alkali.

In detail, the following oxidation reactions are performed according to the type of oxidizing agent:

$$NO + H_2O_2 \rightarrow NO_2 + H_2O; \tag{1}$$

$$2NO + NaClO_2 \rightarrow 2NO_2 + NaCl; \tag{2}$$

$$2NO + KMnO_4 \rightarrow 2NO_2 + KMnO_2; \text{ and} \tag{3}$$

$$P_4 + O_2 \rightarrow P_4O + O$$

$$P_4O + xO_2 \rightarrow P_4O_{10} + mO$$

$$O + O_2 \rightarrow O_3$$

$$NO + O_3 \rightarrow NO_2 + O_2$$

$$P_4O_{10} + 6H_2O \rightarrow 4H_3PO_4. \tag{4}$$

The first injection unit 300 for injection of an absorption solution is installed in the absorption tower 200. The circulation pump 320 serves to collect the absorption solution from the absorption tank 100 and to supply the collected absorption solution to the first injection unit 300.

In this case, the second injection unit 400 may be installed in parallel with the first injection unit 300 in the absorption tower 200. In the present embodiment, the second injection unit 400 is formed above the first injection unit 300.

Accordingly, the exhaust gas introduced into the inlet duct 210 may flow downward of the absorption tower 200, primarily come into contact with the oxidizing agent solution injected by the second injection unit 400, and secondarily come into contact with the absorption solution injected by the first injection unit 300.

That is, as described above, the exhaust gas having passed through the second injection unit 400 is raised by the circulation pump 320 to come into gas-liquid contact with the absorption solution injected by the first injection unit 300, so that the absorption solution absorbs nitrogen dioxide ($NO_2$) and sulfur dioxide ($SO_2$) which are present in the exhaust gas.

In detail, the following reactions are performed in connection with nitrogen dioxide ($NO_2$):

$$2NO_2 + H_2O \rightarrow HNO_2 + HNO_3; \text{ and} \tag{5}$$

$$3HNO_2 \rightarrow HNO_3 + 2NO + H_2O. \tag{6}$$

In addition, the following reactions are performed if both of nitrogen monoxide (NO) and nitrogen dioxide ($NO_2$) are present in the exhaust gas:

$$NO + NO_2 \rightarrow N_2O_3; \tag{7}$$

$$N_2O_3 + H_2O \rightarrow 2HNO_2; \text{ and} \tag{8}$$

$$3HNO_2 \rightarrow HNO_3 + 2NO + H_2O. \tag{9}$$

As described above, by reacting with water (reactions (1), (3), and (4)), either the nitrogen dioxide ($NO_2$) produces nitrous acid ($HNO_2$) or the nitrogen monoxide (NO) and the nitrogen dioxide ($NO_2$) produce nitric acid ($HNO_3$). The nitrous acid ($HNO_2$) is decomposed again and releases nitrogen monoxide (NO) before the nitrous acid ($HNO_2$) is stably oxidized, since it is an unstable intermediate product (reactions (2) and (5)).

Accordingly, since the absorption solution of the present disclosure includes an organic catalyst, particularly an organic sulfoxide in the present embodiment, the organic sulfoxide may be bonded with an unstable intermediate product to form a stable complex. That is, the organic sulfoxide forms a complex with the unstable nitrous acid ($HNO_2$) to stabilize it and prevent its decomposition. Specifically, free electron pairs of sulfur (S) atoms in the organic sulfoxide are bonded with the nitrous acid ($HNO_2$) to prevent its decomposition.

In addition, the following reaction is performed in connection with sulfur dioxide ($SO_2$):

$$SO_2 + H_2O \rightarrow H_2SO_3. \tag{10}$$

As described above, the sulfur dioxide ($SO_2$) is dissolved in water to produce sulfurous acid ($H_2SO_3$). The reaction may be reversed due to an increase in temperature before the sulfurous acid ($H_2SO_3$) is stably oxidized since the sulfurous acid ($H_2SO_3$) also corresponds to an unstable intermediate product. Hence, the sulfur dioxide ($SO_2$) may be released again. That is, the solubility of the sulfur dioxide ($SO_2$) decreases as the temperature rises.

In order to enhance the absorption of the sulfur dioxide ($SO_2$), decompose the sulfur dioxide ($SO_2$), and prevent the sulfur dioxide ($SO_2$) from being released again, the organic sulfoxide in the absorption solution may form a stable complex with the sulfur dioxide ($SO_2$). Specifically, the organic sulfoxide may be bonded with the sulfur dioxide ($SO_2$) in a 1:1 ratio through the coordination bond of oxygen (O) atoms in the organic sulfoxide with free electron pairs of sulfur (S) atoms in the sulfur dioxide ($SO_2$). Thus, it is possible to remove the sulfur dioxide ($SO_2$) from the exhaust gas using the organic sulfoxide.

In this case, it is preferable that the first and second injection units 300 and 400 are evenly formed at all positions in the cross-section of the absorption tower 200 in order to prevent the exhaust gas from passing through the absorption tower 200 without coming into contact with the absorption solution and the oxidizing agent solution.

Accordingly, the exhaust gas from which nitrogen oxides and sulfur oxides are removed is discharged through the outlet duct 220, and the absorption solution absorbing the nitrogen oxides (nitrogen dioxide) and the sulfur oxides (sulfur dioxide) falls back into the absorption tank 100.

In this case, the exhaust gas flowing toward the outlet duct 220 through the first and second injection units 300 and 400 contains moisture (mist). In order to absorb and remove the moisture, a mist eliminator 230 may be installed at the outlet duct 220.

The oxygen supply pipe 600 for the supply of oxygen-containing gas (air, in the present embodiment) is installed to the absorption tank 100.

As air is supplied into the absorption solution of the absorption tank 100 through the oxygen supply pipe 600, the oxidation reaction of nitrous acid ($HNO_2$) and sulfurous acid ($H_2SO_3$) is performed in the absorption tank 100.

In detail, the following reactions are performed:

$$HNO_2 + \tfrac{1}{2}O_2 \rightarrow HNO_3; \text{ and} \tag{11}$$

$$H_2SO_3 + \tfrac{1}{2}O_2 \rightarrow H_2SO_4. \tag{12}$$

As described above, as the unstable nitrous acid ($HNO_2$) and sulfurous acid ($H_2SO_3$) are oxidized to stable nitric acid ($HNO_3$) and sulfuric acid ($H_2SO_4$), the organic sulfoxide bonded thereto is decomposed and then bonded with new nitrous acid and sulfurous acid. Thus, the organic catalyst is continuously reusable.

The absorption tank 100 may further include an agitator 120 installed to stir the absorption solution. Since a rotary flow is formed in the absorption tank 100 by the agitator 120, the air supplied through the oxygen supply pipe 600 can be finely divided to increase the contact area and time between the air and the absorption solution, thereby enabling oxidation efficiency to be improved.

According to another embodiment of the present disclosure, the oxygen supply pipe may consist of a plurality of oxygen supply pipes, which are spaced apart from each other in the circumferential direction of the absorption tank 100 and inclined in the same direction in the circumferential direction of the absorption tank 100. Thus, the absorption solution can be stirred by the air supplied through the oxygen supply pipes without a separate agitator.

After the reaction or reactions are performed as described above, the absorption solution may be separated into an aqueous phase and a sulfoxide phase to completely remove the nitrogen oxides and sulfur oxides absorbed into the absorption solution by releasing the oxidized nitric acid ($HNO_3$) and sulfuric acid ($H_2SO_4$).

As a result, nitric acid and sulfuric acid are present in the aqueous phase since the nitric acid and the sulfuric acid have a very high solubility in water, and oil-derived organic sulfoxide is present in the sulfoxide phase.

Accordingly, the nitric acid and the sulfuric acid can be completely removed by separating and releasing only the aqueous phase from the absorption tank 100, and the sulfoxide phase can be reused as an absorption solution by bonding with fresh water.

Moreover, the present disclosure may further include a neutralization tank 900 to neutralize the nitric acid and sulfuric acid released from the absorption tank 100.

That is, after the phase separation of the absorption solution, the aqueous phase may be released from the absorption tank 100 to the neutralization tank 900, and nitric acid and sulfuric acid may be neutralized by a neutralizing agent to form nitrate and sulfate.

The neutralizing agent for neutralization may be an ammonia aqueous solution. In detail, the following reactions are performed:

$$HNO_3+NH_4OH \rightarrow NH_4NO_3+H_2O; \text{ and} \quad (13)$$

$$H_2SO_4+2NH_4OH \rightarrow (NH_4)2SO_4+2H_2O. \quad (14)$$

In addition, the neutralizing agent for neutralization may be urea water. In detail, the following reactions are performed:

$$2HNO_3+(NH_2)2CO+H_2O \rightarrow 2NH_4NO_3+CO_2; \text{ and} \quad (15)$$

$$H_2SO_4+(NH_2)2CO+H_2O \rightarrow (NH_4)2SO_4+CO_2. \quad (16)$$

Consequently, it is possible to obtain an ammonium nitrate fertilizer and an ammonium sulfate fertilizer.

Although not illustrated in the drawings, the neutralizing agent may be supplied from a neutralizing agent storage tank separate from the neutralization tank 900 by a supply pump.

However, the present disclosure is not limited thereto, and the neutralizing agent for neutralization may be directly supplied into the absorption tank 100 without the neutralization tank 900. Accordingly, the neutralization reaction of nitric acid and sulfuric acid is performed in the absorption tank 100 as in the reaction formulas (13) and (14) or the reaction formulas (15) and (16), and nitrate and sulfate may be released from the absorption tank 100. That is, it is possible to simultaneously absorb and neutralize the nitrogen oxides and sulfur oxides in exhaust gas.

In addition, the neutralizing agent for neutralization may be a calcium carbonate ($CaCO_3$) aqueous solution, and it is consequently possible to obtain gypsum. In detail, the following reaction is performed:

$$H_2SO_4+CaCO_3+H_2O \rightarrow CaSO_4.2H_2O+CO_2. \quad (17)$$

In order to regulate the flow rate of the oxidizing agent solution supplied to the second injection unit 400, namely, to regulate the injection amount of the oxidizing agent solution injected by the second injection unit 400, the present disclosure includes the control unit 700 and the concentration meter 800.

The concentration meter 800 may measure the concentration of nitrogen monoxide (NO) in the exhaust gas introduced into the inlet duct 210. The control unit 700 may control the injection amount of the oxidizing agent solution injected by the second injection unit 400 according to the concentration of nitrogen monoxide (NO) measured by the concentration meter 800.

The flow control valve V1 may be an electric valve that regulates a flow rate by adjusting its opening degree by receiving an electrical signal. That is, the control unit 700 may send the electrical signal to adjust the opening degree of the flow control valve V1.

In detail, the control unit 700 may increase the injection amount of the oxidizing agent solution injected by the second injection unit 400 if the concentration of nitrogen monoxide in exhaust gas measured by the concentration meter 800 exceeds a reference value. That is, the control unit 700 may increase the flow rate of the oxidizing agent solution supplied to the second injection unit 400 by sending an electrical signal to open the flow control valve V1.

The control unit 700 may decrease the injection amount of the oxidizing agent solution injected by the second injection unit 400 if the concentration of nitrogen monoxide in exhaust gas measured by the concentration meter 800 does not exceed the reference value. That is, the control unit 700 may decrease the flow rate of the oxidizing agent solution supplied to the second injection unit 400 by sending an electrical signal to close the flow control valve V1.

That is, it is possible to supply the amount of the oxidizing agent required to oxidize the nitrogen monoxide (NO) in exhaust gas to nitrogen dioxide ($NO_2$).

As described above, it is possible to efficiently oxidize the nitrogen monoxide contained in exhaust gas by regulating the injection amount of the oxidizing agent solution injected by the second injection unit 400 according to the concentration of nitrogen monoxide in exhaust gas, and it is possible to reduce operation costs by regulating the injection amount of the oxidizing agent solution.

Next, a system according to a second embodiment of the present disclosure will be described with reference to FIGS. 4 and 5.

The system according to the second embodiment of the present disclosure can regulate the flow rate of the absorption solution injected by the first injection unit 300 in addition to the system according to the above-mentioned first embodiment. A description of the configuration of the first embodiment will be omitted, and a structure for regulating the flow rate of the absorption solution injected by the first injection unit 300 will be described. The same reference numerals denote the same components.

In the present embodiment, the first injection unit 300 may include a plurality of header pipes 310 installed in the absorption tower 200, a plurality of injection nozzles 317 installed to each of the header pipes 310, a circulation pump 320 for supplying the absorption solution in the absorption tank 100 to the header pipes 310, a first connection pipe 330 connected to the circulation pump 320, and a plurality of second connection pipes 340 branched from the first connection pipe 330 to be connected to the respective header pipes 310.

The header pipes 310 may each have a rectilinear shape and may be horizontally installed in the absorption tower 200. The header pipes 310 may be arranged vertically in parallel with the flow direction of the exhaust gas introduced into the inlet duct 210.

That is, first to sixth header pipes 311 to 316 may be arranged in parallel with each other in the absorption tower 200 as illustrated in FIG. 5. The horizontal distance from the position where the inlet duct 210 is provided at the absorption tower 200 increases from the first header pipe 311 to the sixth header pipe 316. However, the present disclosure is not limited to this configuration, and the number and shape of the header pipes may be variously formed. For example, the plurality of header pipes, each having a circular or square shape, may also be arranged at regular intervals in the absorption tower 200.

Since the plurality of injection nozzles 317 are installed to each of the header pipes 310, the absorption solution introduced into the header pipe 310 may be injected upward through the injection nozzles 317 in the absorption tower 200.

In the present embodiment, the circulation pump 320 serves to supply an absorption solution to the header pipes 310 and collect the absorption solution from the absorption tank 100, but the present disclosure is not limited thereto. It is preferable that the absorption solution is collected from the upper side of the absorption tank 100 such that a large amount of unreacted limestone may be supplied without mixing a large amount of by-products, gypsum ($CaSO_4.2H_2O$) in the present embodiment, produced by desulfurization reaction.

Accordingly, the absorption solution, which is elevated by the circulation pump 320 and injected by the injection nozzles 317 after it is supplied to the header pipes 310 through the first and second connection pipes 330 and 340, comes into gas-liquid contact with the exhaust gas having passed through the second injection unit 400 and absorbs nitrogen dioxide ($NO_2$) and sulfur dioxide ($SO_2$) present in the exhaust gas.

The first connection pipe 330 may be provided with a first flow control valve 332 to regulate the flow rate of the absorption solution introduced into the second connection pipes 340. In this case, the first flow control valve 332 may be an electric valve and regulate a flow rate by adjusting its opening degree by receiving an electrical signal.

The flow rate of the absorption solution introduced through the first flow control valve 332 may be regulated according to the flow rate of exhaust gas or the concentration of sulfur dioxide. To this end, a flow meter 810 or a concentration meter 820 may be installed on the inlet duct 210 to measure the flow rate of the exhaust gas introduced through the inlet duct 210 or the concentration of sulfur dioxide in the exhaust gas introduced therethrough.

First, a case where the flow meter 810 is installed will be described. If the flow rate of exhaust gas measured by the flow meter 810 exceeds a predetermined value, the flow rate of the absorption solution introduced through the first flow control valve 332 may be increased. If the flow rate of exhaust gas measured by the flow meter 810 does not exceed the predetermined value, the flow rate of the absorption solution introduced through the first flow control valve 332 may be decreased.

Here, the predetermined value may be a flow rate value of exhaust gas suitable to maintain the basic flow rate of the absorption solution injected by the first injection unit 300. The predetermined value is preferably a range of values (rather than a single value) including an appropriate range of the flow rate of exhaust gas. In this case, the flow rate of the absorption solution introduced through the first flow control valve 332 may be increased if the flow rate of exhaust gas measured by the flow meter 810 exceeds the predetermined value, whereas the flow rate of the absorption solution introduced through the first flow control valve 332 may be decreased if it does not exceed the predetermined value.

The flow rate of the absorption solution supplied to each of the second connection pipes 340 may be increased or decreased by the same amount by regulating the flow rate of the absorption solution introduced through the first flow control valve 332. As a result, the flow rate of the absorption solution, which is supplied to each of the header pipes 310 and injected through the injection nozzles 317, may be increased or decreased by the same amount. That is, the injection height of the absorption solution injected through the injection nozzles 317 may be increased or decreased.

As described above, the flow rate of the absorption solution introduced through the first flow control valve 332, namely, injected from the header pipes 310 through the first and second connection pipes 330 and 340, is regulated according to the flow rate of exhaust gas. Therefore, if the flow rate of exhaust gas is high, the injection height of the absorption solution injected from the injection nozzles 317 is increased by increasing the flow rate of the absorption solution, thereby enabling the sufficient time and area for gas-liquid contact with the absorption solution to be ensured even though the flow rate of exhaust gas is high. If the flow rate of exhaust gas is low, the flow rate of the absorption solution is decreased, thereby enabling unnecessary power consumption to be reduced.

Next, a case where the concentration meter 820 is installed will be described. If the concentration of sulfur dioxide in exhaust gas measured by the concentration meter 820 exceeds a predetermined value, the flow rate of the absorption solution introduced through the first flow control valve 332 may be increased. If the concentration of sulfur dioxide in exhaust gas measured by the concentration meter 820 does not exceed the predetermined value, the flow rate of the absorption solution introduced through the first flow control valve 332 may be decreased.

Similarly, the flow rate of the absorption solution introduced through the first flow control valve 332, namely, injected from the header pipes 310 through the first and second connection pipes 330 and 340, is regulated according to the concentration of sulfur dioxide in exhaust gas. Therefore, if the concentration of sulfur dioxide is high, the injection height of the absorption solution injected from the injection nozzles 317 is increased by increasing the flow rate of the absorption solution, thereby enabling the sufficient time and area for gas-liquid contact with the absorption solution to be ensured for absorption of sulfur dioxide. If the concentration of sulfur dioxide is low, the flow rate of the absorption solution is decreased, thereby enabling unnecessary power consumption to be reduced.

The present disclosure may further include a booster pump 350 installed to the first connection pipe 330 to assist the circulation pump 320.

Accordingly, even when the capacity of the circulation pump 320 is insufficient when the flow rate of the absorption solution is increased, it is possible to sufficiently increase the flow rate by operating the booster pump 350. Since the booster pump is further provided in the existing installed circulation pump, it is possible to control an increase in flow rate. In this case, if the flow rate of the absorption solution is not increased, the booster pump 350 may not be operated.

The control unit 700 may control the flow rate of the oxidizing agent solution supplied to the second injection unit 400, and may simultaneously control the first flow control valve 332, according to the flow rate of exhaust gas as measured by the flow meter 810 or according to the concentration of sulfur oxide as measured by the concentration meter 820.

The control unit 700 controls the first flow control valve 332 to be further opened to increase the flow rate of the introduced absorption solution, if the measured flow rate of exhaust gas or the measured concentration of sulfur oxide is high. The control unit 700 controls the first flow control valve 332 to be further closed to decrease the flow rate of the introduced absorption solution, if the measured flow rate of exhaust gas or the measured concentration of sulfur oxide is low. In this case, the control unit 700 may send an electrical signal to adjust the opening degree of the first flow control valve 332.

Next, a system according to a third embodiment of the present disclosure will be described with reference to FIGS. 6 and 7.

The system according to the third embodiment of the present disclosure differs from that according to the above-mentioned second embodiment only in that the third embodiment further includes a second flow control valve 342 and in that a plurality of flow meters 810 or concentration meters 820 are provided. Therefore, different parts will be mainly described. The system according to the third embodiment of the present disclosure can locally regulate the flow rate of the absorption solution injected by the first injection unit 300.

In detail, in the present embodiment, the second flow control valve 342 is further installed to each of the second connection pipes 340 to regulate the flow rate of the absorption solution introduced into the header pipe 310 connected thereto. Similar to the first flow control valve 332, the second flow control valve 342 may be an electric valve and regulate a flow rate by adjusting its opening degree by receiving an electrical signal.

The flow rate of the absorption solution introduced through the second flow control valve 342 may be regulated according to the flow rate of exhaust gas or the concentration of sulfur dioxide in each of a plurality of regions as described below.

Accordingly, it is possible to regulate the overall flow rate of the absorption solution injected through the injection nozzles 317 and to regulate the individual flow rate of the absorption solution injected through the injection nozzles 317 by individually regulating the flow rate of the absorption solution supplied to each header pipe 310.

To this end, a plurality of flow meters 810 or concentration meters 820 may be installed in a plurality of regions in the absorption tower 200 to measure the flow rate of exhaust gas or the concentration of sulfur dioxide in each of the regions.

First, a case where the flow meters 810 are installed will be described. The plurality of flow meters 810 may be installed in the plurality of regions in the absorption tower 200. That is, the flow meters 810 may be installed in the regions divided according to the horizontal distance from the position where the inlet duct 210 is installed to the absorption tower 200.

The flow meters 810 may be installed from a short distance to a long distance in the direction in which the header pipes 310 are arranged side by side. In the present embodiment, a first flow meter 812 is installed in a region where the first and second header pipes 311 and 312 are disposed, a second flow meter 814 is installed in a region where the third and fourth header pipes 313 and 314 are disposed, and a third flow meter 816 is installed in a region where the fifth and sixth header pipes 315 and 316 are disposed. The number or arrangement of header pipes 310 and flow meters 810 may vary depending on the size and shape of the absorption tank 100.

The flow meters 810 are installed between the inlet duct 210 and the header pipes 310 to measure the flow rate of exhaust gas before passing through the header pipes 310.

Accordingly, if the flow rate of exhaust gas measured by the flow meter 810 in one of the regions exceeds a predetermined value, the flow rate of the absorption solution introduced through the second flow control valve 342 connected to the header pipe 310 disposed in that region may be increased. If the flow rate of exhaust gas measured by the flow meter 810 in one of the regions does not exceed the predetermined value, the flow rate of the absorption solution introduced through the second flow control valve 342 connected to the header pipe 310 disposed in that region may be decreased.

As described above, the flow rate of the absorption solution supplied to each of the header pipes 310 may be individually increased or decreased by individually regulating the flow rate of the absorption solution introduced through the second flow control valve 342. Consequently, the flow rate of the absorption solution injected through the injection nozzles 317 installed to each of the header pipes 310 may be individually increased or decreased. That is, the injection height of the absorption solution injected through the injection nozzles 317 may be individually increased or decreased.

As described above, the flow rate of the absorption solution introduced through each of the second flow control valves 342, namely, injected from each of the header pipes 310, is regulated according to the flow rate of exhaust gas in each region. Therefore, if the flow rate of exhaust gas is high, the injection height of the absorption solution injected from the injection nozzles 317 is increased by increasing the flow rate of the absorption solution, thereby enabling the sufficient time and area for gas-liquid contact with the absorption solution to be ensured even though the flow rate of exhaust gas is high. If the flow rate of exhaust gas is low, the flow rate of the absorption solution is decreased, thereby enabling unnecessary power consumption to be reduced.

Furthermore, it is possible to uniform the flow rate of exhaust gas as a whole after the exhaust gas passes through the header pipes 310.

Next, a case where the concentration meters 820 are installed will be described. The plurality of concentration meters 820 may be installed in the plurality of regions in the absorption tower 200. Similarly the flow meters 810, the concentration meters 820 may be installed in the regions divided according to the horizontal distance from the position where the inlet duct 210 is installed to the absorption tower 200. However, the present disclosure is not limited to this configuration, and the number or arrangement of header pipes 310 and concentration meters 820 may vary depending on the size and shape of the absorption tank 100.

The concentration meters 820 are installed between the inlet duct 210 and the header pipes 310 to measure the concentration of sulfur dioxide in exhaust gas before passing through the header pipes 310.

Accordingly, if the concentration of sulfur dioxide in exhaust gas measured by the concentration meter 820 in one of the regions exceeds a predetermined value, the flow rate of the absorption solution introduced through the second flow control valve 342 connected to the header pipe 310 disposed in that region may be increased. If the concentration of sulfur dioxide in exhaust gas measured by the flow meter 810 in one of the regions does not exceed the predetermined value, the flow rate of the absorption solution introduced through the second flow control valve 342 connected to the header pipe 310 disposed in that region may be decreased.

Similarly, the flow rate of the absorption solution introduced through each of the second flow control valves 342, namely, injected from each of the header pipes 310, is regulated according to the concentration of sulfur dioxide in exhaust gas in each region. Therefore, if the concentration of sulfur dioxide is high, the injection height of the absorption solution injected from the injection nozzles 317 is increased by increasing the flow rate of the absorption solution, thereby enabling the sufficient time and area for gas-liquid contact with the absorption solution to be ensured to absorb the sulfur dioxide. If the concentration of sulfur dioxide is low, the flow rate of the absorption solution is decreased, thereby enabling unnecessary power consumption to be reduced.

The control unit 700 may control the flow rate of the oxidizing agent solution supplied to the second injection unit 400 and simultaneously control the second flow control valve 342 according to the flow rate of exhaust gas or the concentration of sulfur oxide in each of the regions measured by each of the flow meters 810 or each of the concentration meters 820.

The control unit 700 controls the second flow control valve 342 connected to the header pipe 310 disposed in one of the regions to be further opened to increase the flow rate of the introduced absorption solution, if the flow rate of exhaust gas or the concentration of sulfur oxide in that region as measured by the associated flow meter 810 or the associated concentration meter 820 is high. The control unit 700 controls the second flow control valve 342 connected to the header pipe 310 disposed in one of the regions to be further closed to decrease the flow rate of the introduced absorption solution, if the flow rate of exhaust gas or the concentration of sulfur oxide in that region as measured by the associated flow meter 810 or the associated concentration meter 820 is low. In this case, the control unit 700 may send an electrical signal to adjust the opening degree of the second flow control valve 342.

At the same time, the control unit 700 may control the first flow control valve 332 according to the overall flow rate of exhaust gas or the overall concentration of sulfur dioxide.

Next, a system according to a fourth embodiment of the present disclosure will be described with reference to FIG. 8.

The system according to the fourth embodiment of the present disclosure may largely include an absorption tank 100, a first absorption tower 1200, a second absorption tower 2200, an exhaust gas inlet duct 210, an exhaust gas outlet duct 220, a first injection unit 300, a circulation pump 320, a second injection unit 400, an oxidizing agent supply unit 500, an oxygen supply pipe 600, a control unit 700, and a concentration meter 800.

The system according to the fourth embodiment differs from that according to the first embodiment only in that a plurality of absorption towers, namely, first and second absorption towers 1200 and 2200, are provided. Therefore, different parts will be mainly described.

The first and second absorption towers 1200 and 2200 each extend upward of the absorption tank 100 in parallel with each other. The first and second absorption towers 1200 and 2200 may be formed integrally with the absorption tank 100.

The exhaust gas inlet duct 210 for introduction of exhaust gas is provided at one side of the absorption tower 200 and the exhaust gas outlet duct 220 for discharge of purified exhaust gas is provided at the other side of the absorption tower 200. In the present embodiment as shown in FIG. 8, the inlet duct 210 is provided at the upper left of the first absorption tower 1200 and the outlet duct 220 is provided at the upper right of the second absorption tower 2200.

Accordingly, the exhaust gas introduced into the first absorption tower 1200 through the inlet duct 210 may flow downward in the first absorption tower 1200, and the exhaust gas introduced into the second absorption tower 2200 across the absorption tank 100 may flow upward in the second absorption tower 2200.

Similar to the first embodiment, the first and second injection units 300 and 400 are installed in parallel with each other in the first absorption tower 1200, and the second injection unit 400 is formed above the first injection unit 300.

Accordingly, the exhaust gas introduced into the inlet duct 210 may flow downward in the first absorption tower 1200, primarily come into contact with the oxidizing agent solution injected by the second injection unit 400, and secondarily come into contact with the absorption solution injected by the first injection unit 300. Therefore, it is possible to obtain the same reaction and effect as those of the first embodiment.

Only the first injection unit 300 is installed in the second absorption tower 2200. The exhaust gas introduced into the second absorption tower 2200 may flow upward and thirdly come into contact with the absorption solution injected by the first injection unit 300.

Since the second injection unit 400 is not installed in the second absorption tower 2200, the injection height of the absorption solution injected by the first injection unit 300 installed in the second absorption tower 2200 may be greater than that of the absorption solution injected by the first injection unit 300 installed in the first absorption tower 1200.

Accordingly, nitrogen dioxide and sulfur dioxide remaining in exhaust gas after passing through the first absorption tower 1200 can be additionally absorbed in the second absorption tower 2200, and denitrification and desulfurization efficiency can thus be improved.

Finally, a system according to a fifth embodiment of the present disclosure will be described with reference to FIGS. 9 and 10.

The system according to the fifth embodiment of the present disclosure may largely include an absorption tank 100, an absorption tower 200, an exhaust gas inlet duct 3210, an exhaust gas outlet duct 3220, a first injection unit 3300, a circulation pump 320, a second injection unit 3400, an oxidizing agent supply unit 500, an oxygen supply pipe 600, a control unit 700, a concentration meter 800, and a turbulence generator 3240.

The system according to the fifth embodiment differs from that according to the first embodiment only in that the fifth embodiment has a different structure in the exhaust gas inlet duct 3210, the exhaust gas outlet duct 3220, the first injection unit 3300, and the second injection unit 3400 and further includes the turbulence generator 3240. Therefore, different parts will be mainly described.

In the present embodiment, the inlet duct 3210 may extend inward from the upper side of the absorption tower 200 and then extend downward into the center of the absorption tower 200 as illustrated in FIG. 9. The outlet duct 3220 is formed at one side of the upper portion of the absorption tower 200.

Accordingly, the exhaust gas introduced into the absorption tower 200 through the inlet duct 3210 travels downward in the absorption tower 200 through the inlet duct 3210 before flowing upward in the absorption tower 200 to be discharged through the outlet duct 3220.

The second injection unit 3400 is installed in the inlet duct 3210, and the first injection unit 3300 is installed in the absorption tower 200. In the present embodiment, the first injection unit 3300 is installed throughout the absorption tower 200 excluding the inlet duct 3210, but the present disclosure is not limited to this configuration. That is, the first injection unit 3300 may also be provided in the inlet duct 3210.

The present embodiment further includes the turbulence generator 3240 installed in the inlet duct 3210. The turbulence generator 3240 is disposed above the second injection unit 3400. Thus, the turbulence generator 3240 generates the turbulence of the exhaust gas introduced through the inlet duct 3210, thereby enabling oxidation efficiency to be increased by using the generated turbulence to mix the oxidizing agent solution injected through the second injection unit 3400. To this end, the present embodiment may further include a drive unit (not shown) to drive the turbulence generator 3240.

As described above, the exhaust gas introduced into the absorption tower 200 through the inlet duct 3210 may primarily come into contact with the oxidizing agent solution injected by the second injection unit 400 through the inlet duct 3210, and secondarily come into contact with the absorption solution injected by the first injection unit 300 by flowing upward in the absorption tower 200. Therefore, it is possible to obtain the same reaction and effect as those of the first embodiment.

The present disclosure is not limited the above installation of the turbulence generator 3240, which may instead be installed in the absorption tower 200 in the present embodiment.

The structure for universally and/or locally regulating the flow rate of the absorption solution injected by the first injection unit 300 may be applied to the fourth and fifth embodiments as well as the first embodiment.

According to the present disclosure, it is possible to simultaneously remove nitrogen oxides and sulfur oxides using the organic catalyst by injecting the liquid oxidizing agent to oxidize the nitrogen monoxide (NO) contained in exhaust gas.

As described above, it is possible to simultaneously perform denitrification and desulfurization at a low cost by the single system and process made by adding a denitrification capability to the conventional wet flue-gas desulfurization system. In addition, low-temperature denitrification is possible.

In addition, it is possible to universally and/or locally regulate the flow rate (injection height) of the absorption solution injected by the first injection unit 300 according to the flow rate of exhaust gas or the concentration of sulfur dioxide. Thus, it is possible to maximize the reaction between the exhaust gas and the absorption solution and obtain the effect of flow rate uniformity.

Ultimately, it is possible to increase the desulfurization efficiency of exhaust gas.

As is apparent from the above description, in accordance with the present disclosure, it is possible to simultaneously remove nitrogen oxides and sulfur oxides using the organic catalyst by injecting the liquid oxidizing agent to oxidize the nitrogen monoxide (NO) contained in exhaust gas.

It is possible to simultaneously perform denitrification and desulfurization at a low cost by the single system and process made by adding a denitrification capability to the conventional wet flue-gas desulfurization system.

It is possible to universally and/or locally regulate the flow rate (injection height) of the absorption solution injected by the first injection unit according to the flow rate of exhaust gas or the concentration of sulfur dioxide. Thus, it is possible to maximize the reaction between the exhaust gas and the absorption solution and obtain the effect of flow rate uniformity.

Ultimately, it is possible to increase the desulfurization efficiency of exhaust gas.

The present disclosure is not limited to the above effects, and it should be understood that the present disclosure includes all effects which can be inferred from the detailed description of the present disclosure or the configuration of the disclosure defined by the appended claims.

The present disclosure is not limited to the above-mentioned specific embodiments and description, and it will be apparent to those skilled in the art that various variations and modifications may be made without departing from the spirit and scope of the disclosure as defined in the following claims. Therefore, these variations and modifications fall within the scope of the disclosure.

What is claimed is:

1. A system for simultaneously removing nitrogen oxides and sulfur oxides from exhaust gas, the system comprising:
    an absorption tank for storing an absorption solution containing an organic catalyst, the absorption tank communicating with an oxygen supply pipe for supplying oxygen-containing gas to the absorption tank;
    an absorption tower, extending upward from the absorption tank, through which the exhaust gas flows from an exhaust gas inlet duct to an exhaust gas outlet;
    a first injection unit to inject the absorption solution into the absorption tower;
    a second injection unit to inject an oxidizing agent solution into at least one of the inlet duct and the absorption tower; and
    an oxidizing agent supply unit for supplying the oxidizing agent solution to the second injection unit.

2. The system according to claim 1, wherein the organic catalyst includes an oil-derived organic sulfoxide.

3. The system according to claim 1, wherein the oxidizing agent in the oxidizing agent solution includes at least one of H2O2, NaClO2, KMnO4, and P4O10.

4. The system according to claim 1, wherein the exhaust gas introduced into the inlet duct primarily comes into contact with the oxidizing agent solution injected by the second injection unit, and secondarily comes into contact with the absorption solution injected by the first injection unit.

5. The system according to claim 1, wherein the oxidizing agent supply unit comprises:
    a storage tank for storing the oxidizing agent solution; and
    a feed pump for supplying the stored oxidizing agent solution to the second injection unit.

6. The system according to claim 1, wherein the second injection unit comprises a tray having a plurality of nozzles from which the oxidizing agent solution is injected.

7. The system according to claim 6, wherein each of the nozzles is equipped with an ultrasonic mist generator.

8. The system according to claim 6, wherein the tray consists of a plurality of trays alternately and respectively installed on opposite sides of the absorption tower.

9. The system according to claim 1, further comprising a concentration meter for measuring a concentration of nitrogen monoxide (NO) in the exhaust gas introduced into the inlet duct.

10. The system according to claim 9, further comprising a control unit to control an injection amount of the oxidizing agent solution injected by the second injection unit according to the concentration of nitrogen monoxide (NO) in exhaust gas measured by the concentration meter.

11. The system according to claim 10, wherein the control unit is configured to increase the injection amount of the oxidizing agent solution injected by the second injection unit when the concentration of nitrogen monoxide (NO) in exhaust gas measured by the concentration meter exceeds a reference value, and to decrease the injection amount of the oxidizing agent solution injected by the second injection unit when the concentration of nitrogen monoxide (NO) in exhaust gas measured by the concentration meter does not exceed the reference value.

12. The system according to claim 1, further comprising a turbulence generator installed in at least one of the inlet duct and the absorption tower.

13. The system according to claim 1, further comprising a neutralization tank to neutralize nitric acid and sulfuric acid released from the absorption tank.

14. The system according to claim 13, wherein the neutralizing agent for neutralization includes one of ammonia-water, urea-water, and calcium carbonate aqueous solution.

15. The system according to claim 1, wherein a flow rate of the absorption solution injected by the first injection unit is regulated.

16. The system according to claim 1, wherein the first injection unit comprises:
    a plurality of header pipes installed in the absorption tower;
    a plurality of injection nozzles installed to each of the header pipes;
    a circulation pump for supplying the absorption solution in the absorption tank to the header pipes;
    a first connection pipe connected to the circulation pump; and
    a plurality of second connection pipes branched from the first connection pipe to be respectively connected to the header pipes.

17. The system according to claim 16, wherein the first connection pipe is provided with a first flow control valve to regulate a flow rate of the absorption solution introduced into the second connection pipes.

18. The system according to claim 16, wherein each of the second connection pipes is provided with a second flow control valve to regulate a flow rate of the absorption solution introduced into the header pipe connected to that second connection pipe.

19. The system according to claim 1, further comprising at least one of:
    a first flow meter installed in the inlet duct to measure a flow rate of the exhaust gas introduced through the inlet duct; and
    a second flow meter installed in each of a plurality of regions in the absorption tower to measure a flow rate of exhaust gas in that region.

20. The system according to claim 1, further comprising at least one of:
    a first concentration meter installed in the inlet duct to measure a concentration of sulfur dioxide in the exhaust gas introduced through the inlet duct; and
    a second concentration meter installed in each of a plurality of regions in the absorption tower to measure a concentration of sulfur dioxide in exhaust gas in that region.

* * * * *